(12) United States Patent
Liu et al.

(10) Patent No.: US 12,184,712 B2
(45) Date of Patent: Dec. 31, 2024

(54) METHOD AND APPARATUS OF PROCESSING BACK-TO-ORIGIN REQUEST OF CONTENT DELIVERY NETWORK, DEVICE, AND MEDIUM

(71) Applicant: BEIJING VOLCANO ENGINE TECHNOLOGY CO., LTD., Beijing (CN)

(72) Inventors: Huawei Liu, Beijing (CN); Jian Wang, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/667,789

(22) Filed: May 17, 2024

(65) Prior Publication Data

US 2024/0388616 A1 Nov. 21, 2024

(30) Foreign Application Priority Data

May 18, 2023 (CN) .......................... 202310567586.9

(51) Int. Cl.
*H04L 65/65* (2022.01)
*H04L 61/45* (2022.01)

(52) U.S. Cl.
CPC ............ *H04L 65/65* (2022.05); *H04L 61/457* (2022.05)

(58) Field of Classification Search
CPC .............................. H04L 65/65; H04L 61/457
See application file for complete search history.

(56) References Cited

U.S. PATENT DOCUMENTS

2020/0304457 A1* 9/2020 Xie ...................... H04L 61/2567
2021/0344608 A1* 11/2021 Zeng ........................ H04L 12/46
(Continued)

FOREIGN PATENT DOCUMENTS

CN 107995314 A 5/2018
CN 109873855 A 6/2019
(Continued)

OTHER PUBLICATIONS

China National Intellectual Property Administration, Office Action Issued in Application No. 202310567586.9, Aug. 12, 2024, 14 pages.
(Continued)

*Primary Examiner* — Kostas J Katsikis
(74) *Attorney, Agent, or Firm* — Alleman Hall & Tuttle LLP (57) ABSTRACT

The present disclosure discloses a method and apparatus of processing a back-to-origin request of a content delivery network, a device, and a medium. The method includes: receiving a back-to-origin request carrying an access identifier, wherein the access identifier includes a target accelerating domain name and a target service provider identification; querying a target origin site corresponding to the target accelerating domain name, and acquiring origin site configuration information corresponding to the target origin site; generating a target access identifier of the target origin site based on the origin site configuration information; and transmitting the target access identifier to the target CDN server corresponding to the target service provider identification, wherein the target CDN server acquires a target resource from the target origin site according to the target access identifier.

20 Claims, 5 Drawing Sheets

(56) References Cited

U.S. PATENT DOCUMENTS

2021/0344638 A1* 11/2021 Chen .................. H04L 67/1012
2022/0255894 A1*  8/2022 You .................... H04L 61/4511
2023/0014940 A1*  1/2023 Zhang ............. H04N 21/23113

FOREIGN PATENT DOCUMENTS

| | | |
|---|---|---|
| CN | 112333290 A | 2/2021 |
| CN | 113037888 A | 6/2021 |
| CN | 109660578 B | 1/2022 |
| CN | 115277809 A | 11/2022 |
| CN | 115695580 A | 2/2023 |
| CN | 110944027 B | 4/2023 |
| CN | 116527632 A | 8/2023 |
| WO | 2019196825 A1 | 10/2019 |

OTHER PUBLICATIONS

ISA China National Intellectual Property Administration, International Search Report Issued in Application No. PCT/CN2024/093312, Jul. 24, 2024, WIPO, 6 pages.

European Patent Office, Extended European Search Report Issued in Application No. 24176968.7, Nov. 18, 2024, 6 pages.

\* cited by examiner

METHOD AND APPARATUS OF PROCESSING BACK-TO-ORIGIN REQUEST OF CONTENT DELIVERY NETWORK, DEVICE, AND MEDIUM

CROSS-REFERENCE TO RELATED APPLICATIONS

The present disclosure is based on and claims priority to China Patent Application No. 202310567586.9 filed on May 18, 2023 and entitled as "Method and apparatus of processing back-to-origin request of content delivery network, device, and medium", the disclosure of which is incorporated by reference herein in its entirety.

TECHNICAL FIELD

The present disclosure relates to the field of communication technology, and in particular, to a method and apparatus of processing a back-to-origin request of a content delivery network, a device, and a medium.

BACKGROUND

For current Internet businesses, if there is a need for continuous and real-time efficient configuration of accelerating domain names of different content delivery network (CDN for short) service providers, with respect to OpenAPI which generally aligns the automatic creation of domain names with the CDN service providers, a general solution is to perform domain name creation based on a minimum function template domain name scheme.

SUMMARY

The present disclosure provides a method and apparatus of processing a back-to-origin request of a content delivery network, a device, and a medium.

According to an aspect of embodiments of the present disclosure, there is provided a method of processing a back-to-origin request of a content delivery network, wherein the method is applied to an origin site server in communication connection with a plurality of CDN servers, and the method comprises:
receiving a back-to-origin request carrying an access identifier, wherein the access identifier comprises a target accelerating domain name which is generated by a target CDN server according to preset configuration information and a target service provider identification which is a target service provider identification of the target CDN server;
querying a target origin site corresponding to the target accelerating domain name, and acquiring origin site configuration information corresponding to the target origin site;
generating a target access identifier of the target origin site based on the origin site configuration information; and
transmitting the target access identifier to the target CDN server corresponding to the target service provider identification, wherein the target CDN server acquires a target resource from the target origin site according to the target access identifier.

According to another aspect of the embodiments of the present disclosure, there is further provided a method of processing a back-to-origin request of a content delivery network, wherein the method is applied to a target CDN server which is any of CDN servers in communication connection with an origin site server, and the method comprises:
receiving a business request from a client, wherein the business request carries an original access identifier of a business to be accessed by the client;
in response to the business request, acquiring business information of the business to be accessed by using the original access identifier, and generating a target accelerating domain name based on the business information and preset configuration information corresponding to the target CDN server;
generating a back-to-origin request based on the target accelerating domain name and a target service provider identification of the target CDN server, and transmitting the back-to-origin request to the origin site server; and
receiving a target access identifier fed back by the origin site server based on the back-to-origin request, and acquiring a target resource from a target origin site by using the target access identifier.

According to another aspect of the embodiments of the present disclosure, there is further provided an apparatus of processing a back-to-origin request of a content delivery network, comprising:
a first receiving module configured to receive a back-to-origin request carrying an access identifier, wherein the access identifier comprises a target accelerating domain name which is generated by a target CDN server according to preset configuration information and a target service provider identification which is a target service provider identification of the target CDN server;
a querying module configured to query a target origin site corresponding to the target accelerating domain name, and acquire origin site configuration information corresponding to the target origin site;
a first generating module configured to generate a target access identifier of the target origin site based on the origin site configuration information; and
a transmitting module configured to transmit the target access identifier to the target CDN server corresponding to the target service provider identification, wherein the target CDN server acquires a target resource from the target origin site according to the target access identifier.

According to another aspect of the embodiments of the present disclosure, there is further provided an apparatus of processing a back-to-origin request of a content delivery network, comprising:
a second receiving module configured to receive a business request from a client, wherein the business request carries an original access identifier of a business to be accessed by the client;
a responding module configured to, in response to the business request, acquire business information of the business to be accessed by using the original access identifier, and generate a target accelerating domain name based on the business information and preset configuration information corresponding to the target CDN server;
a second generating module configured to generate a back-to-origin request based on the target accelerating domain name and a target service provider identification of the target CDN server, and transmit the back-to-origin request to an origin site server; and a processing module configured to receive a target access identifier fed back by the origin site server based on the back-to-origin request, and acquire a target resource from a target origin site by using the target access identifier.

According to another aspect of the embodiments of the present disclosure, there is further provided a non-transitory computer-readable storage medium, comprising a stored program which, when executed, performs the above steps.

According to another aspect of the embodiments of the present disclosure, there is further provided an electronic device, comprising a processor, a communication interface, a memory, and a communication bus, wherein mutual communication among the processor, the communication interface, and the memory is made through the communication bus, and wherein the memory is configured to store a computer program; and the processor is configured to, by executing the program stored on the memory, perform the steps of any of the above methods.

An embodiment of the present disclosure further provides a computer program product containing instructions which, when executed on a computer, cause the computer to perform the steps of any of the above methods.

An embodiment of the present disclosure further provides a computer program which, when executed on a computer, causes the computer to perform the steps of any of the above methods.

BRIEF DESCRIPTION OF THE DRAWINGS

The accompanying drawings here, which are incorporated in and constitute a part of this specification, illustrate embodiments consistent with the present disclosure and, together with the description, serve to explain the principles of the present disclosure.

In order to more clearly illustrate technical solutions in the embodiments of the present disclosure or the related art, the drawings that need to be used in the description of the embodiments or the related art will be briefly described below, and it is apparent that for those skilled in the art, other drawings can be obtained according to these drawings without paying creative labor.

DETAILED DESCRIPTION

To make the objectives, technical solutions and advantages of the embodiments of the present disclosure more apparent, the technical solutions in the embodiments of the present disclosure will be described in detail and completely below in conjunction with the drawings in the embodiments of the present disclosure; it is apparent that the described embodiments are only a part of the embodiments of the present disclosure, but not all of them, and the illustrative embodiments and descriptions thereof are used for explaining the present disclosure and do not constitute improper limitations on the present disclosure. Based on the embodiments in the present disclosure, all other embodiments, which are obtained by one of ordinary skill in the art without making any creative labor, shall fall within the scope of protection of the present disclosure.

It should be noted that, relational terms such as "first" and "second", herein, are only used for distinguishing one entity or operation from another similar entity or operation without necessarily requiring or implying any such actual relation or order between these entities or operations. Moreover, the term "comprise", "include", or any other variation thereof, is intended to encompass a non-exclusive inclusion, such that a process, method, article, or device comprising a list of elements not only includes those elements, but also includes other elements not expressly listed, or also includes elements inherent to such a process, method, article, or device. Without more limitations, an element defined by a statement "comprising a" does not exclude the presence of another identical element in a process, method, article, or device that includes the element.

The embodiments of the present disclosure provide a method and apparatus of processing a back-to-origin request of a content delivery network, a device, and a medium. The method provided by the embodiments of the present disclosure may be applied to any required electronic device, which may be, for example, an electronic device such as a server, a terminal, or the like; specific limitations are not made here, and for convenience of description, it is hereinafter simply referred to as an electronic device.

At present, with respect to businesses for static domain names such as picture, download, on-demand broadcasting, and the like, their corresponding origin sites distribute globally, so that every time one accelerating domain name is configured on a CDN side, the problem of accelerating domain name adaptation needs to be solved on the origin site subsequently, finally resulting in that the domain name creation business is complex and cannot be converged.

Compared with the related art, the technical solutions provided by the embodiments of the present disclosure have the following advantages: according to the method provided by the embodiments of the present disclosure, an origin site server receives a back-to-origin request of a CDN server, and thus the CDN server is decoupled from the business domain name and the CDN server does not need to transmit the back-to-origin request directly to the origin site, and the origin site server uniformly issues an access identifier for accessing the origin site to the CDN server, thereby solving the problem that domain name creation and adaptation processes for different origin sites cannot be converged.

Figure 1:
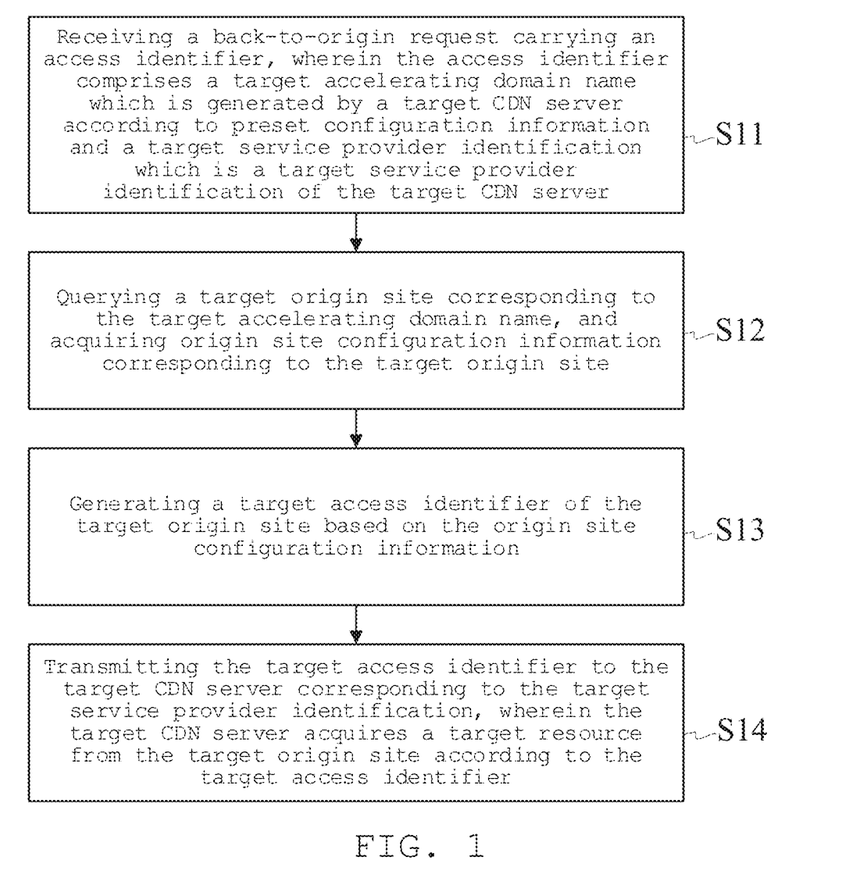
FIG. 1 is a flowchart of a method of processing a back-to-origin request of a content delivery network according to an embodiment of the present disclosure.

According to an aspect of the embodiments of the present disclosure, there is provided a method embodiment of a method of processing a back-to-origin request of a content delivery network. FIG. 1 is a flowchart of a method of processing a back-to-origin request of a content delivery network according to an embodiment of the present disclosure, and as shown in FIG. 1, the method comprises:

step S11, receiving a back-to-origin request carrying an access identifier, wherein the access identifier comprises a target accelerating domain name which is generated by a target CDN server according to preset configuration information and a target service provider identification which is a target service provider identification of the target CDN server.

The method provided by the embodiment of the present disclosure is applied to an origin site server in communication connection with a plurality of CDN servers, and the origin site server can be understood as a 302 server of the origin site. 302 in the 302 server represents a temporary transfer, and since the accelerating domain name carried by the back-to-origin request transmitted by the CDN server is temporarily changed, the 302 server of the origin site is added to temporarily receive the back-to-origin request of the CDN server and return an access identifier of the corresponding origin site to the CDN server. Therefore, the problem that domain name creation businesses of origin sites with different businesses cannot be converged is solved.

Specifically, when the CDN server performs back-to-origin, it no longer needs to perform direct back-to-origin to a related business origin site, but performs back-to-origin to the 302 server of the origin site. Therefore, the complexity of the creation process of the domain name is reduced, while the CDN server is decoupled from the business domain name and the CDN server does not need to direct back-to-origin to the related business origin site, which achieves the effect that the difficulty of business operation and maintenance is converged after the business domain name expands.

In the embodiment of the present disclosure, a CDN server receives a business request transmitted by a client, which carries an original resource identifier (Uniform Resource Locator, URL for short) of a business to be currently accessed by the client, and the CDN server needs to perform back-to-origin based on the original resource identifier, i.e., configure a target accelerating domain name by using preset configuration information and business information of the business to be accessed; the preset configuration information is pre-configured by an origin site server on the CDN server, and the preset configuration information includes: an authentication parameter, a server address of the origin site server, etc. After the configuration of the target accelerating domain name is completed, the target CDN server generates a back-to-origin request by using the target accelerating domain name and its own server identification, and transmits the back-to-origin request to the origin site server.

In the embodiment of the present disclosure, the origin site server receives the back-to-origin request, extracts the target accelerating domain name and a target service provider identification from the back-to-origin request, and takes the CDN server corresponding to the target service provider identification as the target CDN server. The origin site server subsequently analyzes the target accelerating domain name and finally feeds back an access identifier to the CDN server, so that the CDN server acquires a corresponding resource by using the access identifier.

Step S12, querying a target origin site corresponding to the target accelerating domain name, and acquiring origin site configuration information corresponding to the target origin site.

In the embodiment of the present disclosure, before the querying a target origin site corresponding to the target accelerating domain name, the method further comprises the following steps A1-A2:

step A1, detecting whether the target accelerating domain name carries signature information; and step A2, in response to the target accelerating domain name carrying the signature information, determining that the target accelerating domain name supports authenticated access, and verifying the signature information to obtain a verification result.

In the embodiment of the present disclosure, after obtaining the target accelerating domain name, the origin site server will detect whether the target accelerating domain name carries signature information, and if the target accelerating domain name carries the signature information, it is indicated that the target accelerating domain name is required to support authenticated access, and at this time, the origin site server needs to verify the signature information.

As an example, the verification process may be that, the origin site server acquires a public key of the target CDN server, and then decrypts the signature information by using the public key to obtain the decrypted signature information. Then, encryption calculation is performed on the decrypted signature information by using an encryption algorithm the same as that for the target CDN server. The obtained calculation result is verified with the signature information to obtain a verification result. If the calculation result is consistent with the signature information, the verification result is that the verification is passed. If the calculation result is inconsistent with the signature information, the verification result is that the verification is not passed.

In the embodiment of the present disclosure, if the target accelerating domain name does not carry the signature information, this shows that the target accelerating domain name is not required to be authenticated, and it can be direct back-to-origin to the corresponding origin site.

In the embodiment of the present disclosure, the querying a target origin site corresponding to the target accelerating domain name, and acquiring origin site configuration information corresponding to the target origin site comprises the following steps B1-B2:

step B1, in response to the verification result being that the verification is passed, acquiring a target scheduling rule matched with the target accelerating domain name, and taking an origin site indicated by the target scheduling rule as the target origin site.

In the embodiment of the present disclosure, in response to the verification result being that the verification is passed, a plurality of scheduling rules currently configured in the origin site server are acquired, wherein the scheduling rules include but are not limited to: those set according to different CDN service providers, or those set according to a business type. Based on this, a field carried by the target accelerating domain name is matched with current scheduling rules, a hit scheduling rule is determined as a target scheduling rule, and an origin site indicated by the target scheduling rule is taken as the target origin site.

As an example, current scheduling rules include: CDN-01—origin site K, CDN-02—origin site M, and CDN-03—origin site N; a service provider field carried by a target accelerating domain name is "CDN-02", at this time, it can be determined that a hit scheduling rule is "CDN-02—origin site M", while the origin site M is taken as a target origin site.

Step B2, reading the origin site configuration information corresponding to the target origin site, wherein the origin site configuration information comprises: an authentication algorithm, an authentication parameter, an origin site address corresponding to the target origin site, and a back-to-origin host.

In the embodiment of the present disclosure, after determining a target origin site to which the CDN server performs back-to-origin, the origin site server reads origin site configuration information corresponding to the target origin site, wherein the origin site configuration information comprises: an authentication algorithm, an authentication parameter, an origin site address corresponding to the target origin site, and a back-to-origin host. The authentication parameter is specific information relied on when the origin site performs signature calculation, and the back-to-origin host is a domain name address which needs to be accessed by the CDN server for back-to-origin. In addition, authentication algorithms configured for origin sites with different services are different.

Step S13, generating a target access identifier of the target origin site based on the origin site configuration information.

In the embodiment of the present disclosure, after obtaining the origin site configuration information, the origin site server generates a target access identifier by using the origin site configuration information; specifically, the origin site server performs signature calculation on the authentication parameter, the origin site address corresponding to the target origin site, and the back-to-origin host by using an authentication algorithm, to generate one url with which the target origin site can be accessed, i.e., a target access identifier. The authentication algorithm may be: Tos V1 Sign, OSS MBuckt, OBS Sign, or the like.

Step S14, transmitting the target access identifier to the target CDN server corresponding to the target service provider identification, wherein the target CDN server acquires a target resource from the target origin site according to the target access identifier.

In the embodiment of the present disclosure, after generating the target access identifier, the origin site server transmits the target access identifier to the target CDN server, and the target CDN server issues an access request to the target origin site based on the target access identifier to acquire a corresponding target resource.

According to the method provided by the embodiment of the present disclosure, an origin site server receives a back-to-origin request of a CDN server, and thus the CDN server is decoupled from the business domain name and the CDN server does not need to transmit the back-to-origin request directly to the origin site, and the origin site server uniformly issues an access identifier for accessing the origin site to the CDN server, which solves the problem that the domain name creation and adaptation processes for different origin sites cannot be converged.

Figure 2:
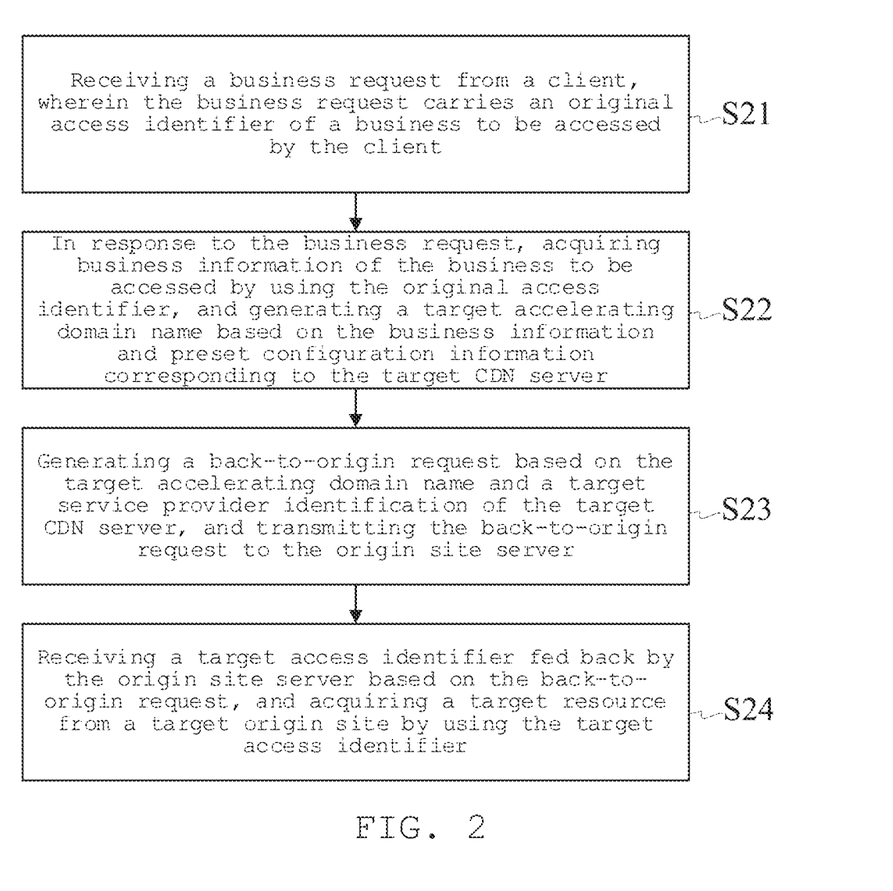
FIG. 2 is a flowchart of a method of processing a back-to-origin request of a content delivery network according to another embodiment of the present disclosure.

FIG. 2 is a flowchart of a method of processing a back-to-origin request of a content delivery network according to an embodiment of the present disclosure, and as shown in FIG. 2, the method comprises the following steps:

step S21, receiving a business request from a client, wherein the business request carries an original access identifier of a business to be accessed by the client.

The method provided by the embodiment of the present disclosure is applied to a target CDN server, which is any of CND servers in communication connection with an origin site server. When a user wants to access a resource of a certain business, he may transmit a business request through a client. Specifically, the client first acquires current belonging-to information, then determines a business to be accessed, and acquires an original domain name of the business to be accessed; for example: a current business to be accessed by the client is X, and an original domain name is X-aaa-com. Finally, an original access identifier (Uniform Resource Locator, URL for short) is generated based on the original domain name and the belonging-to information, and the original access identifier is carried in the business request and the business request is transmitted to the target CDN server. The business to be accessed may be a video business, a picture business, a music business, or the like.

In the embodiment of the present disclosure, after receiving the business request transmitted by the client, the target CDN server can extract an original access identifier from the business request. Subsequently, business information of the business to be accessed is acquired through the original access identifier, and the original access identifier is rewritten by using the business information to generate a target accelerating domain name for back-to-origin.

Step S22, in response to the business request, acquiring business information of the business to be accessed by using the original access identifier, and generating a target accelerating domain name based on the business information and preset configuration information corresponding to the target CDN server.

In the embodiment of the present disclosure, the target CDN server, in response to the business request, acquires business information of the business to be accessed by using the original access identifier, wherein the business information includes: a business type, a business service Key, etc.

It should be noted that, the business information is acquired by using the original access identifier. On one hand, by using the business information, it can be determined whether the business to be accessed satisfies a back-to-origin condition of the origin site server. On the other hand, in response to that the back-to-origin condition of the origin site server is satisfied, by using the business information, the accelerating domain name can be configured.

In the embodiment of the present disclosure, the generating a target accelerating domain name based on the business information and preset configuration information corresponding to the target CDN server comprises the following steps C1-C3:

step C1, detecting whether the business to be accessed satisfies a domain name creation rule of the origin site server by using the business information, to obtain a detection result.

In the embodiment of the present disclosure, the target CDN server is configured with a plurality of business types for which the origin site server currently supports the accelerating domain name creation, and based on this, by using the business type in the business information, it is determined whether the business to be accessed is matched with the business type stored in the target CDN server, and it is determined whether a requirement for authenticated access exists in the business information, to obtain a detection result. Specifically:

(1) if the business type in the business information is matched with any of the business types stored in the target CDN server and the requirement for authenticated access exists in the business information, the detection result is that: the business to be accessed supports accessing the origin site server and carries an authenticated access identification;

(2) if the business type in the business information is matched with any of the business types stored in the target CDN server and the requirement for authenticated access does not exist in the business information, the detection result is that: the business to be accessed supports accessing the origin site server and does not carry an authenticated access identification; and (3) if the business type in the business information is matched with none of the business types stored in the target CDN server, the detection result is that, the business to be accessed does not support accessing the origin site server.

In the embodiment of the present disclosure, if the detection result is that the business to be accessed supports accessing the origin site server and carries the authenticated access identification, and the detection result is that the business to be accessed supports accessing the origin site server and does not carry the authenticated access identification, the current process can be continuously executed. If accessing the origin site server is not supported, the current process is terminated.

Step C2, acquiring a target domain name creation template corresponding to the detection result, wherein the target domain name creation template comprises a plurality of configuration items.

In the embodiment of the present disclosure, the acquiring a target domain name creation template corresponding to the detection result comprises: in response to the detection result being that the business to be accessed supports accessing the origin site server and does not carry an authenticated access identification, taking an original domain name creation template as the target domain name creation template.

In the embodiment of the present disclosure, if the detection result is that the business to be accessed supports accessing the origin site server and does not carry the authenticated access identification, which indicates that the business to be accessed does not need the signature at the time of back-to-origin, an original domain name creation template may be directly taken as the target domain name creation template at this time. The original domain name creation template is as follows: {business type abbreviation}{CDN service provider identification}{service provider product type abbreviation}-{business service key}-{business service key2}-{origin site address}.{second level domain name}.

In the embodiment of the present disclosure, the acquiring a target domain name creation template corresponding to the detection result comprises: in response to the detection result being that the business to be accessed supports accessing the origin site server and carries an authenticated access identification, generating signature information by using the authenticated access identification, and carrying the signature information into the original domain name creation template to obtain the target domain name creation template.

In the embodiment of the present disclosure, if the detection result is that the business to be accessed supports accessing the origin site server and carries the authenticated access identification, which indicates that the business to be accessed needs the signature at the time of back-to-origin, at this time, it is possible to generate the signature information by directly using the authenticated access identification, and carry the signature information into an original domain name creation template to obtain the target domain name creation template: {business type abbreviation}{CDN service provider identification}{service provider product type abbreviation}{business service key}-{business service key2}-sign-{origin site address}.{second level domain name}.

It should be noted that the business type abbreviation may be: p (representing a picture business), v (representing a video business), etc. The service provider product type abbreviation may be used for distinguishing different product types of the service provider, for example, for a service provider K, the default of "null" may be employed for its common product type, and for another example, a service provider J's product type abbreviation is "j". The business service key/key2 is business information applied for in a custom way when a domain name is applied for with respect to the business, and "sign" represents whether the accelerating domain name supports the authenticated access. The origin site address represents different back-to-origin addresses that the CDN server needs to configure, for example, "sg" represents an area A standard picture origin site address p-9J-sg.xxxxxxx.com, etc., wherein 9 is a CDN service provider identification of the service provider J, and j is the service provider product type abbreviation for the service provider J.

Step C3, acquiring data content corresponding to the respective configuration items, and writing the data content into the target domain name creation template to obtain the target accelerating domain name.

In the embodiment of the present disclosure, after the target domain name configuration template is obtained, data content of the configuration items such as {business type abbreviation}, {business service key}, {business service key2}, and the like may be acquired from the business information, and data content of the configuration items such as {CDN service provider identification}, {service provider product type abbreviation}, {origin site address}, and the like may be acquired from the preset configuration information of the target CDN server. The acquired data content is written into the target domain name creation template to obtain a target accelerating domain name.

In addition, non-authentication accelerating domain names (namely accelerating domain names not carrying "sign") in the same second level domain name are placed under the same "property", and share the cache by default. Authentication accelerating domain names (namely accelerating domain names carrying "sign") in the same second level domain name are placed under the same "property", and share the cache by default. The authentication domain name and the non-authentication domain name do not share the cache.

As an example, for a non-authentication picture business which uses a service provider H and returns to the sg standard origin site, its accelerating domain name is: p16h-test-demo.test.com, wherein 16 is a CDN provider identification of the service provider H, and h is a provider product type abbreviation of the service provider H.

It should be noted that, in order to provide caching for a static cache domain name, it may be required that non-authentication/authentication domain names in the same second level domain name are respectively placed in different "properties". In an early stage, for a first-appearing business second level domain name, it can be created by a CDN service provider, and the business side only needs to determine whether a corresponding "property" exists, if the corresponding "property" exists, it is put into the "property"; otherwise, a manual configuration is made. In a later stage, a closed loop is formed by realizing the automated creation of the first "property".

In scenarios where it is determined whether a business needs to be configured with authentication and the origin sites distribute globally, the domain name creation mode provided by the embodiment of the present disclosure achieves automated domain name creation, without the need of manual configuration of the domain name. Meanwhile, the timeliness of the domain name creation is shortened from original N days to minute granularity. Therefore, by providing a standardized accelerating domain name configuration template, not only the domain name configuration efficiency is improved, but also the business domain name is concretized, i.e., through configuration items of the domain name, a property of the domain name, such as an origin site address, a CDN service provider, whether authentication is provided, and the like, can be known.

Step S23, generating a back-to-origin request based on the target accelerating domain name and a target service provider identification of the target CDN server, and transmitting the back-to-origin request to the origin site server.

In the embodiment of the present disclosure, the target CDN server generates an access identifier based on the configured target accelerating domain name (x-cdn-host) and the target service provider identification (x-cdn-vendor) of the target CDN server, adds the access identifier to the back-to-origin request, and transmits the back-to-origin request to the source site server. After the origin site server receives the back-to-origin request, the target accelerating domain name and the target service provider identification are extracted from the back-to-origin request. Subsequently, the origin site server analyzes the target accelerating domain name, and finally feeds back the access identifier to the CDN server.

Step S24, receiving a target access identifier fed back by the origin site server based on the back-to-origin request, and acquiring a target resource from a target origin site by using the target access identifier.

In the embodiment of the present disclosure, the acquiring a target resource from the target origin site by using the target access identifier comprises: generating an access request based on the target access identifier; and transmitting the access request to an origin site cache, so that the origin site cache determines a target access policy by using the target access identifier, and accessing the target origin site according to the target access policy to acquire the target resource.

In the embodiment of the present disclosure, after generating an access request based on the target access identifier, the target CDN server first transmits the access request to an origin site cache, and the origin site cache determines a resource type of a resource to be accessed by it by using the target access identifier, and determines a target access policy according to the resource type. For example: when the resource type is a resource type of external network publication, the target access policy may be direct access. Or when the resource type is a resource type of non-external network publication, the target access policy is to verify the target access identifier, and access can be made after the verification is passed. Finally, the target origin site is accessed according to the target access policy to acquire the target resource.

In the embodiment of the present disclosure, the process of verifying the target access identifier comprises: verifying, by the origin site cache, the signature information in the target access identifier; after the verification of the signature information is passed, re-signing, by the origin site cache, the target access identifier according to a pre-negotiated signature algorithm and an independent authentication parameter; at this time, transmitting the re-signed target access identifier to a storage gateway, and after the storage gateway verifies the signature for it and the verification is passed, finally determining that a resource of non-external network publication can be accessed.

In the method provided by the embodiment of the present disclosure, the resource type of the resource to be accessed by the target access identifier is further determined by using the origin site cache, thereby determining the final target access policy, and if the resource type is a resource type of non-external network publication, the target access identifier needs to be re-signed and needs signature verification, so as to ensure the security of the access.

Figure 3:
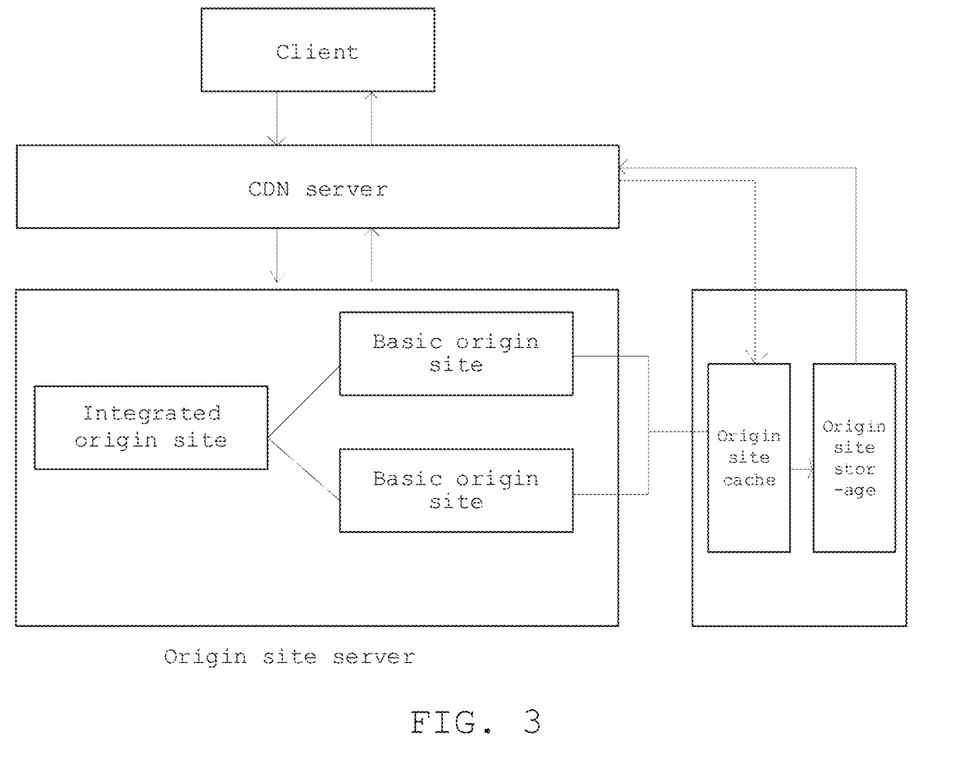
FIG. 3 is a schematic diagram of a process of processing a back-to-origin request according to an embodiment of the present disclosure.

FIG. 3 is a schematic diagram of a procedure of processing a back-to-origin request according to an embodiment of the present disclosure, and as shown in FIG. 3, the procedure comprises:

step 1, transmitting, by a client, a business request to a CDN server, wherein the business request carries an original access identifier of a business to be accessed by the client.

Step 2, receiving, by the CDN server, the business request and acquiring, in response to the business request, business information of the business to be accessed by using the original access identifier, and generating a target accelerating domain name based on the business information and preset configuration information corresponding to the target CDN server.

Step 3, generating, by the CDN server, an access identifier based on the target accelerating domain name and a target service provider identification of the target CDN server, and adding the access identifier to the back-to-origin request and transmitting the back-to-origin request to the origin site server.

Step 4, receiving, by the origin site server, the back-to-origin request, and extracting, from the back-to-origin request, the access identifier carrying the target accelerating domain name and the target service provider identification.

Step 5, querying, by the origin site server, a target origin site corresponding to the target accelerating domain name, and acquiring origin site configuration information corresponding to the target origin site.

Step 6, generating, by the origin site server, a target access identifier of the target origin site based on the origin site configuration information, and transmitting the target access identifier to the CDN server.

Step 7, generating, by the CDN server, an access request based on the target access identifier; and transmitting the access request to an origin site cache so that the origin site cache determines a target access policy by using the target access identifier, and accessing the target origin site according to the target access policy to acquire a target resource.

Figure 4:
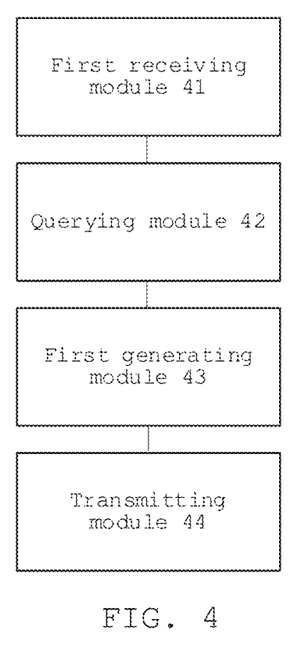
FIG. 4 is a block diagram of an apparatus of processing a back-to-origin request of a content delivery network according to an embodiment of the present disclosure.

FIG. 4 is a block diagram of an apparatus of processing a back-to-origin request of a content delivery network according to an embodiment of the present disclosure, which may be implemented as a part of or all of an electronic device by software, hardware, or a combination of the two. As shown in FIG. 4, the apparatus comprises:

a first receiving module 41 configured to receive a back-to-origin request carrying an access identifier, wherein the access identifier comprises a target accelerating domain name which is generated by a target CDN server according to preset configuration information and a target service provider identification which is a target service provider identification of the target CDN server;

a querying module 42 configured to query a target origin site corresponding to the target accelerating domain name, and acquire origin site configuration information corresponding to the target origin site;

a first generating module 43 configured to generate a target access identifier of the target origin site based on the origin site configuration information; and a transmitting module 44 configured to transmit the target access identifier to the target CDN server corresponding to the target service provider identification, wherein the target CDN server acquires a target resource from the target origin site according to the target access identifier.

In the embodiment of the present disclosure, the apparatus of processing a back-to-origin request of a content delivery network further comprises: a detecting module configured to detect whether the target accelerating domain name carries signature information; and in response to the target accelerating domain name carrying the signature information, determine that the target accelerating domain name supports authenticated access, and verify the signature information to obtain a verification result.

In the embodiment of the present disclosure, the querying module 42 is configured to, in response to the verification result being that the verification is passed, acquire a target scheduling rule matched with the target accelerating domain name, and take an origin site indicated by the target scheduling rule as the target origin site; and read the origin site configuration information corresponding to the target origin site, wherein the origin site configuration information comprises: an authentication algorithm, an authentication parameter, an origin site address corresponding to the target origin site, and a back-to-origin host.

Figure 5:
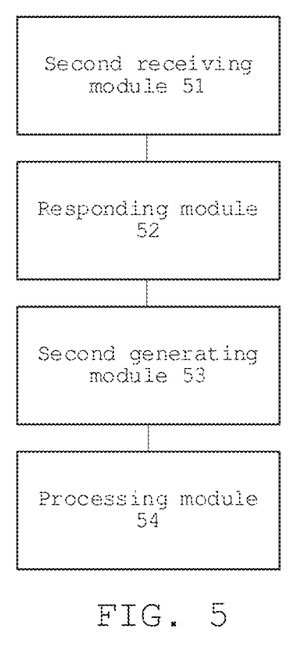
FIG. 5 is a block diagram of an apparatus of processing a back-to-origin request of a content delivery network according to another embodiment of the present disclosure.

FIG. 5 is a block diagram of an apparatus of processing a back-to-origin request of a content delivery network according to an embodiment of the present disclosure, which may be implemented as a part of or all of an electronic device by software, hardware, or a combination of the two. As shown in FIG. 5, the apparatus comprises:
- a second receiving module 51 configured to receive a business request from a client, wherein the business request carries an original access identifier of a business to be accessed by the client;
- a responding module 52 configured to, in response to the business request, acquire business information of the business to be accessed by using the original access identifier, and generate a target accelerating domain name based on the business information and preset configuration information corresponding to the target CDN server;
- a second generating module 53 configured to generate a back-to-origin request based on the target accelerating domain name and a target service provider identification of the target CDN server, and transmit the back-to-origin request to an origin site server; and
- a processing module 54 configured to receive a target access identifier fed back by the origin site server based on the back-to-origin request, and acquire a target resource from a target origin site by using the target access identifier.

In the embodiment of the present disclosure, the generating module 53 is configured to detect whether the business to be accessed satisfies a domain name creation rule of the origin site server by using the business information, to obtain a detection result; acquire a target domain name creation template corresponding to the detection result, wherein the target domain name creation template comprises a plurality of configuration items; and acquire data content corresponding to the respective configuration items, and write the data content into the target domain name creation template to obtain the target accelerating domain name.

In the embodiment of the present disclosure, the generating module 53 is specifically configured to, in response to the detection result being that the business to be accessed supports accessing the origin site server and does not carry an authenticated access identification, take an original domain name creation template as the target domain name creation template; and the generating module 53 is specifically configured to, in response to the detection result being that the business to be accessed supports accessing the origin site server and carries an authenticated access identification, generate signature information by using the authenticated access identification, and carry the signature information into the original domain name creation template to obtain the target domain name creation template.

In the embodiment of the present disclosure, the processing module 54 is configured to generate an access request based on the target access identifier; and transmit the access request to an origin site cache, so that the origin site cache determines a target access policy by using the target access identifier, and access the target origin site according to the target access policy to acquire the target resource.

Figure 6:
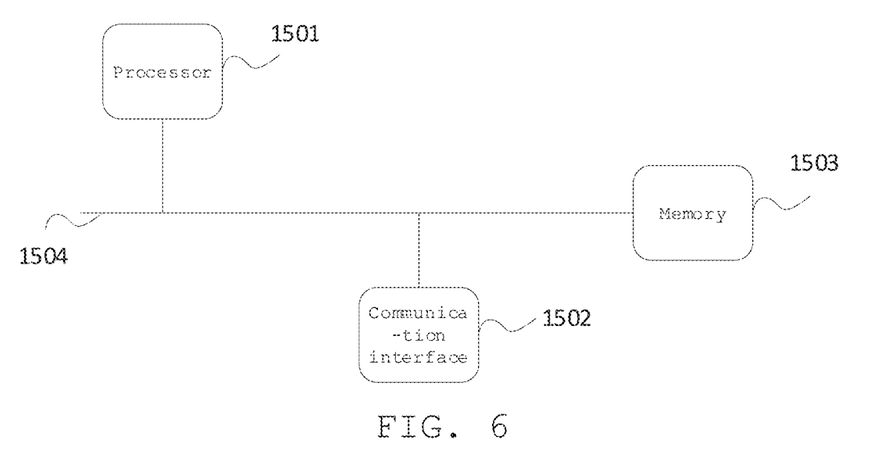
FIG. 6 is a schematic structural diagram of an electronic device according to an embodiment of the present disclosure.

An embodiment of the present disclosure further provides an electronic device, which, as shown in FIG. 6, may comprise: a processor 1501, a communication interface 1502, a memory 1503, and a communication bus 1504, wherein mutual communication among the processor 1501, the communication interface 1502, and the memory 1503 is made through the communication bus 1504.

The memory 1503 is configured to store a computer program; and
the processor 1501 is configured to implement, by executing the computer program stored in the memory 1503, the steps of the foregoing embodiments.

The communication bus mentioned in the above terminal may be a peripheral component interconnect (PCI for short) bus, an extended industry standard architecture (EISA for short) bus, or the like. The communication bus may be divided into an address bus, a data bus, a control bus, etc. For ease of representation, only one thick line is used, but this is not intended to represent that there is only one bus or one type of bus.

The communication interface is used for communication between the terminal and other devices.

The memory may include a random access memory (RAM for short), or a non-volatile memory (non-volatile Memory), such as at least one disk memory. Alternatively, the memory may be also at least one storage located remotely from the processor.

The above processor may be a general-purpose processor, including a central processing unit (CPU for short), a network processor (NP for short), and the like; and may also be a digital signal processor (DSP for short), an application specific integrated circuit (ASIC for short), a field-programmable gate array (FPGA for short) or other programmable logic devices, a discrete gate or a transistor logic device, or a discrete hardware component.

In yet another embodiment provided by the present disclosure, therein is further provided a non-transitory computer-readable storage medium having stored therein instructions which, when executed on a computer, cause the computer to perform the method of processing a back-to-origin request of a content delivery network according to any of the above embodiments.

In yet another embodiment provided by the present disclosure, there is further provided a computer program product containing instructions which, when executed on a computer, cause the computer to perform the method of processing a back-to-origin request of a content delivery network according to any of the above embodiments.

In yet another embodiment provided by the present disclosure, there is further provided a computer program which, when executed on a computer, cause the computer to perform the method of processing a back-to-origin request of a content delivery network according to any of the above embodiments.

The above embodiments can be fully or partially implemented by software, hardware, firmware, or any combination thereof. When implemented using software, they can be fully or partially implemented in a form of a computer program product. The computer program product comprises one or more computer instructions. When the computer program instructions are loaded and executed on a computer, the processes or functions according to the embodiments of the present disclosure are fully or partially generated. The computer can be a general purpose computer, a special purpose computer, a computer network, or other programmable devices. The computer instructions can be stored in a computer-readable storage medium or transmitted from one computer-readable storage medium to another computer-readable storage medium, for example, the computer instructions can be transmitted from one website, computer, server, or data center to another website, computer, server, or data center in a wired (e.g., a coaxial cable, optical fiber, digital subscriber line) or wireless (e.g., infrared, radio, microwave, etc.) manner. The computer-readable storage medium can be any available medium that can be accessed by a computer, or a data storage device such as a server, a data center, etc., where one or more available media are integrated. The usable medium can be a magnetic medium (e.g., a floppy disk, hard disk, magnetic tape), an optical medium (e.g., DVD), or a semiconductor medium (e.g., a solid state disk), etc.

The above only describes the preferred embodiments of the present disclosure, and is not intended to limit the scope of protection of the present disclosure. Any modification, equivalent replacement, improvement or the like made within the spirit and principles of the present disclosure is included within the scope of protection of the present disclosure.

The above only describes specific implementations of the present disclosure, which enable those skilled in the art to understand or implement the present disclosure. Various modifications to these embodiments will be readily apparent to those skilled in the art, and the general principles defined herein can be implemented in other embodiments without departing from the spirit or scope of the present disclosure. Therefore, the present disclosure will not be limited to these embodiments shown herein, but conform to the widest scope consistent with the principles and novel features applied herein.

The invention claimed is:

1. A method of processing a back-to-origin request of a content delivery network, wherein the method is applied to an origin site server in communication connection with a plurality of CDN servers, and the method comprises:
   receiving a back-to-origin request carrying an access identifier, wherein the access identifier comprises a target accelerating domain name which is generated by a target CDN server according to preset configuration information and a target service provider identification which is a target service provider identification of the target CDN server;
   querying a target origin site corresponding to the target accelerating domain name, and acquiring origin site configuration information corresponding to the target origin site;
   generating a target access identifier of the target origin site based on the origin site configuration information; and
   transmitting the target access identifier to the target CDN server corresponding to the target service provider identification, wherein the target CDN server acquires a target resource from the target origin site according to the target access identifier.

2. The method according to claim 1, wherein before the querying a target origin site corresponding to the target accelerating domain name, the method further comprises:
   detecting whether the target accelerating domain name carries signature information; and
   in response to the target accelerating domain name carrying the signature information, determining that the target accelerating domain name supports authenticated access, and verifying the signature information to obtain a verification result.

3. The method according to claim 2, wherein the querying a target origin site corresponding to the target accelerating domain name, and acquiring origin site configuration information corresponding to the target origin site, comprises:
   in response to the verification result being that the verification is passed, acquiring a target scheduling rule matched with the target accelerating domain name, and taking an origin site indicated by the target scheduling rule as the target origin site; and
   reading the origin site configuration information corresponding to the target origin site, wherein the origin site configuration information comprises: an authentication algorithm, an authentication parameter, an origin site address corresponding to the target origin site, and a back-to-origin host.

4. A method of processing a back-to-origin request of a content delivery network, wherein the method is applied to a target CDN server which is any of CDN servers in communication connection with an origin site server, and the method comprises:
   receiving a business request from a client, wherein the business request carries an original access identifier of a business to be accessed by the client;
   in response to the business request, acquiring business information of the business to be accessed by using the original access identifier, and generating a target accelerating domain name based on the business information and preset configuration information corresponding to the target CDN server;
   generating a back-to-origin request based on the target accelerating domain name and a target service provider identification of the target CDN server, and transmitting the back-to-origin request to the origin site server; and
   receiving a target access identifier fed back by the origin site server based on the back-to-origin request, and acquiring a target resource from a target origin site by using the target access identifier.

5. The method according to claim 4, wherein the generating a target accelerating domain name based on the business information and preset configuration information corresponding to the target CDN server, comprises:
   detecting whether the business to be accessed satisfies a domain name creation rule of the origin site server by using the business information, to obtain a detection result;
   acquiring a target domain name creation template corresponding to the detection result, wherein the target domain name creation template comprises a plurality of configuration items; and acquiring data content corresponding to the respective configuration items, and writing the data content into the target domain name creation template to obtain the target accelerating domain name.

6. The method according to claim 5, wherein the acquiring a target domain name creation template corresponding to the detection result, comprises:
in response to the detection result being that the business to be accessed supports accessing the origin site server and does not carry an authenticated access identification, taking an original domain name creation template as the target domain name creation template; and
in response to the detection result being that the business to be accessed supports accessing the origin site server and carries an authenticated access identification, generating signature information by using the authenticated access identification, and carrying the signature information into the original domain name creation template to obtain the target domain name creation template.

7. The method according to claim 4, wherein the acquiring a target resource from the target origin site by using the target access identifier, comprises:
generating an access request based on the target access identifier; and
transmitting the access request to an origin site cache, so that the origin site cache determines a target access policy by using the target access identifier, and accessing the target origin site according to the target access policy to acquire the target resource.

8. A non-transitory computer-readable storage medium, wherein the storage medium comprises a stored program, wherein the program, when executed, performs the following operations of processing a back-to-origin request of a content delivery network:
receiving a back-to-origin request carrying an access identifier, wherein the access identifier comprises a target accelerating domain name which is generated by a target CDN server according to preset configuration information and a target service provider identification which is a target service provider identification of the target CDN server;
querying a target origin site corresponding to the target accelerating domain name, and acquiring origin site configuration information corresponding to the target origin site;
generating a target access identifier of the target origin site based on the origin site configuration information; and
transmitting the target access identifier to the target CDN server corresponding to the target service provider identification, wherein the target CDN server acquires a target resource from the target origin site according to the target access identifier.

9. The storage medium according to claim 8, wherein the program, when executed, performs the following operations before the querying a target origin site corresponding to the target accelerating domain name:
detecting whether the target accelerating domain name carries signature information; and
in response to the target accelerating domain name carrying the signature information, determining that the target accelerating domain name supports authenticated access, and verifying the signature information to obtain a verification result.

10. The storage medium according to claim 9, wherein the querying a target origin site corresponding to the target accelerating domain name, and acquiring origin site configuration information corresponding to the target origin site, comprises:
in response to the verification result being that the verification is passed, acquiring a target scheduling rule matched with the target accelerating domain name, and taking an origin site indicated by the target scheduling rule as the target origin site; and
reading the origin site configuration information corresponding to the target origin site, wherein the origin site configuration information comprises: an authentication algorithm, an authentication parameter, an origin site address corresponding to the target origin site, and a back-to-origin host.

11. A non-transitory computer-readable storage medium, wherein the storage medium comprises a stored program, wherein the program, when executed, performs the method according to claim 4.

12. A non-transitory computer-readable storage medium, wherein the storage medium comprises a stored program, wherein the program, when executed, performs the method according to claim 5.

13. A non-transitory computer-readable storage medium, wherein the storage medium comprises a stored program, wherein the program, when executed, performs the method according to claim 6.

14. A non-transitory computer-readable storage medium, wherein the storage medium comprises a stored program, wherein the program, when executed, performs the method according to claim 7.

15. An electronic device, comprising a processor, a communication interface, a memory, and a communication bus, wherein mutual communication among the processor, the communication interface, and the memory is made through the communication bus, and wherein
the memory is configured to store a computer program; and
the processor is configured to, by executing the program stored on the memory, perform the method according to claim 1.

16. An electronic device, comprising a processor, a communication interface, a memory, and a communication bus, wherein mutual communication among the processor, the communication interface, and the memory is made through the communication bus, and wherein
the memory is configured to store a computer program; and
the processor is configured to, by executing the program stored on the memory, perform the method according to claim 2.

17. An electronic device, comprising a processor, a communication interface, a memory, and a communication bus, wherein mutual communication among the processor, the communication interface, and the memory is made through the communication bus, and wherein
the memory is configured to store a computer program; and
the processor is configured to, by executing the program stored on the memory, perform the method according to claim 3.

18. An electronic device, comprising a processor, a communication interface, a memory, and a communication bus, wherein mutual communication among the processor, the communication interface, and the memory is made through the communication bus, and wherein
the memory is configured to store a computer program; and the processor is configured to, by executing the program stored on the memory, perform the method according to claim 4.

19. An electronic device, comprising a processor, a communication interface, a memory, and a communication bus, wherein mutual communication among the processor, the communication interface, and the memory is made through the communication bus, and wherein
- the memory is configured to store a computer program; and
- the processor is configured to, by executing the program stored on the memory, perform the method according to claim 5.

20. An electronic device, comprising a processor, a communication interface, a memory, and a communication bus, wherein mutual communication among the processor, the communication interface, and the memory is made through the communication bus, and wherein
- the memory is configured to store a computer program; and
- the processor is configured to, by executing the program stored on the memory, perform the method according to claim 6.

\* \* \* \* \*